A. M. TAMM AND J. TENNESSEN, Jr.
BLOWER PIPE, WIND BREAK, AND SILAGE DISTRIBUTER.
APPLICATION FILED OCT. 9, 1919.
1,353,674. Patented Sept. 21, 1920.
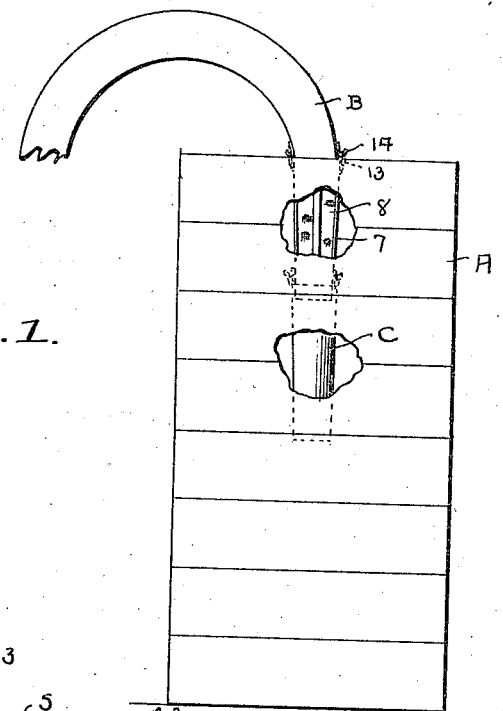
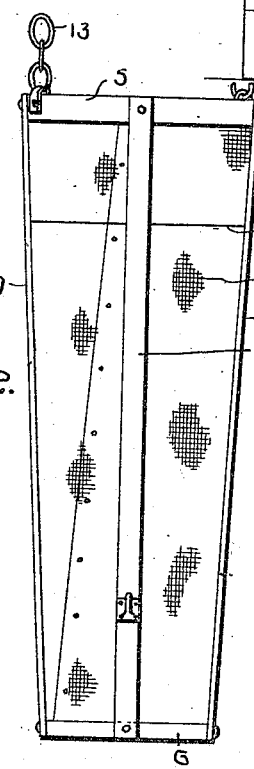
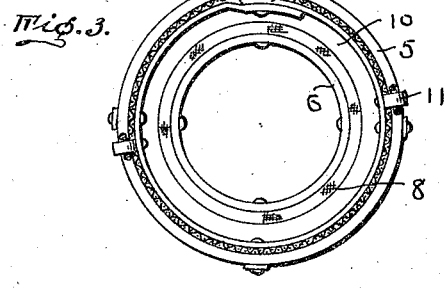
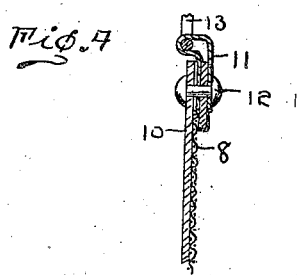
Inventor
A. M. Tamm,
J. Tennessen, Jr.
By Geo. N. Kimmel
Attorney

UNITED STATES PATENT OFFICE.

ALFRED M. TAMM AND JOHN TENNESSEN, JR., OF BRILLION, WISCONSIN.

BLOWER-PIPE, WIND-BREAK, AND SILAGE-DISTRIBUTER.

1,353,674.                Specification of Letters Patent.    Patented Sept. 21, 1920.

Application filed October 9, 1919. Serial No. 329,637.

*To all whom it may concern:*

Be it known that we, ALFRED M. TAMM and JOHN TENNESSEN, Jr., citizens of the United States, residing at Brillion, in the county of Calumet and State of Wisconsin, have invented certain new and useful Improvements in Blower-Pipes, Wind-Breaks, and Silage-Distributers, of which the following is a specification.

The invention relates to a blower pipe attachment for use in filling silos, and more particularly to the class of blower pipes, wind break and silage distributers.

The primary object of the invention is the provision of an attachment or device of this character, wherein the same is suspended from the cap or head of a blower pipe between it and the delivery nozzle within the silo so that the effect of the air when forced through blow pipe will be caused to escape, and will not be forced down through the delivery nozzle, so that when the cut feed and silage drops to the bottom in the silo, it is in a mixed condition and will remain therein.

Heretofore, in the use of blower pipes of the ordinary well known construction it appears that when the air is driven therethrough the effect of the air so driven by the blower causes the cut feed and silage to separate, the lighter portions being thrown to the outside of the silo, and the heavier portions remaining in the center thereof, thus making it necessary for the whole mass to be remixed before packing of the silo.

Another object of the invention is the provision of an attachment or device of this character, wherein the construction thereof is novel in form so that it can be readily positioned in an assembled relation to the blower pipe and its delivery nozzle, and in the use thereof a uniform distribution of the feed or silage is had within the silo as the air driven into the blower pipe will be broken up in the columnar form and the feed and silage will be mixed and remain in this condition in the silo.

A further object of the invention is the provision of an attachment or device of this character which is extremely simple in construction, thoroughly reliable and efficient in its purpose, strong, durable and inexpensive to manufacture and install.

In the accompanying drawing:

Figure 1 is an elevation of a conventional form of silo, the same being partly broken away and a portion of a blower pipe showing the attachment or device constructed in accordance with the invention applied and in operative relation thereto.

Fig. 2 is an enlarged side elevation of the attachment or device removed.

Fig. 3 is a top plan view.

Fig. 4 is a fragmentary, vertical sectional view showing in detail the fastening of the hanger straps to the attachment or device.

Similar reference characters indicate corresponding parts throughout the several views in the drawing.

Referring to the drawing in detail, A designates generally a silo which is of conventional form, and B, a portion of a blower pipe at the head or cap end thereof, the blower pipe being of the usually well known construction and is employed with a blower in a silage cutter or other feed handling machine. The blower pipe conveys the cut feed or silage into the silo as usual.

Adapted to be suspended from the head or cap B of the blower pipe within the silo A is one or more delivery nozzles C, there being but one shown in Fig. 1 of the drawing and arranged between the head or cap B of the blower pipe and said nozzle C, is the attachment or device forming the subject matter of the present invention hereinafter fully described.

The attachment or device comprises an inverted truncated substantially conical shaped skeleton frame including top and bottom rings or hoops 5 and 6 respectively, and longitudinal slats or bars 7, which are bolted in overlapped relation to the rings 5 and 6 exteriorly thereof at intervals circumferentially of the same yet said slats or bars 7 may be otherwise fastened to the rings or hoops 5 and 6 to form the unitary skeleton frame structure.

Arranged within the frame structure and coextensive with the length thereof is a reticulated or foraminous body or shell 8 preferably made from a wire mesh or section having the overlapped diagonally disposed riveted longitudinal edges 9 whereby the said body or shell 8 will be correspondingly shaped to the frame structure and is fastened therein at its ends to the end rings or hoops 5 and 6 in any suitable manner.

Arranged within the larger end of the shell or body 8 and extending longitudinally for a short distance therein is a funnel or cylindrical shield 10, which closes the open portion of the body or shell 8 at the upper end thereof for a distance longitudinally of the same to prevent the escape of air therethrough at this end portion.

Straddling the ring 5 at diametrically opposite points thereof are hanger straps 11, each being fastened thereto preferably by rivets 12, passed transversely through the ring or hoop 5, and engaged in these hanger straps are suspension link chains 13 which permit the hanging of the attachment or device upon the head or cap B, of the blower pipe, the latter being provided with suitable keepers 14, for the engagement of the chains 13 therewith, whereby the attachment or device will be suspended from said blower pipe into the silo A as it is clearly shown in Fig. 1 of the drawing.

Mounted on each of a pair of diametrically opposite slats or bars 7 of the frame structure is a keeper 15, spaced from the bottom ring 6 and with which engage suitable suspension means for the hanging of the delivery nozzle C upon the attachment or device as is clearly shown in Fig. 1 of the drawing.

In the use of the attachment or device the blast of air from the blower passes into the blower pipe B for conveying cut feed or silage in the silo A and said air will escape through the wire mesh body or shell 8 so as to break up and reduce the column of air before passing into the delivery nozzle, C to prevent the force of the blast of air passing down into the delivery nozzle C and thereby enabling the cut feed and silage to drop to the bottom of the silo A in a mixed condition, and to remain in this condition therein, thus eliminating the necessity of the whole mass within the silo to be remixed before the packing thereof.

From the foregoing it is thought that the construction and manner of use of the attachment or device will be clearly understood and therefore a more extended explanation has been omitted.

What is claimed is:

1. An attachment or device of the character described, comprising a truncated inverted substantially conical shaped skeleton frame, a reticulated body within said frame and coextensive therewith, and an annular shield within the reticulated body at one end thereof.

2. An attachment or device of the character described, comprising a truncated inverted substantially conical shaped skeleton frame, a reticulated body within said frame and coextensive therewith, an annular shield within the reticulated body at one end thereof, and suspension hangers carried at the larger end of said skeleton frame.

3. An attachment or device of the character described, comprising a truncated inverted substantially conical shaped skeleton frame, a reticulated body within said frame and coextensive therewith, an annular shield within the reticulated body at one end thereof, suspension hangers carried at the larger end of said skeleton frame, and keepers mounted on the frame at diametrically opposite points near the other end thereof, for the suspension of an air nozzle therefrom.

4. An attachment or device of the character described, comprising a truncated inverted substantially conical shaped skeleton frame, a reticulated body within said frame and coextensive therewith, an annular shield within the reticulated body at one end thereof, suspension hangers carried at the larger end of said skeleton frame and keepers mounted on the frame at diametrically opposite points near the other end thereof, for the suspension of an air nozzle therefrom, said frame having longitudinal bars and end rings.

In testimony whereof, we affix our signatures hereto.

ALFRED M. TAMM.
JOHN TENNESSEN, Jr.